United States Patent
Schieberl

(12) 
(10) Patent No.: US 6,641,770 B2
(45) Date of Patent: Nov. 4, 2003

(54) METHOD OF AND APPARATUS FOR PRODUCING INJECTION-MOLDED PARTS

(75) Inventor: Eric Schieberl, Remlingen (DE)

(73) Assignee: Krauss-Maffei Kunststofftechnik GmbH, München (DE)

( * ) Notice: Subject to any disclaimer, the term of this patent is extended or adjusted under 35 U.S.C. 154(b) by 124 days.

(21) Appl. No.: 09/855,260

(22) Filed: May 15, 2001

(65) Prior Publication Data

US 2001/0030385 A1 Oct. 18, 2001

Related U.S. Application Data

(63) Continuation of application No. PCT/EP99/08912, filed on Nov. 20, 1999.

(30) Foreign Application Priority Data

Nov. 20, 1998 (DE) .......................... 198 53 582

(51) Int. Cl.[7] .................. B29C 45/56; B29C 41/12; B29C 41/22

(52) U.S. Cl. .................. 264/259; 264/294; 264/328.8; 264/328.11; 425/145; 425/574

(58) Field of Search ................. 264/259, 293, 264/294, 296, 328.11, 328.8; 425/145, 574, 575

(56) References Cited

U.S. PATENT DOCUMENTS

| | | | |
|---|---|---|---|
| 4,216,184 A | 8/1980 | Thomas | |
| 4,279,582 A | 7/1981 | Osuna-Diaz | |
| 5,336,463 A | * 8/1994 | Hara et al. | ................ 264/328.7 |
| 5,356,576 A | * 10/1994 | Fischbach | ................ 264/40.4 |
| 6,123,889 A | * 9/2000 | Katagiri et al. | ............. 264/255 |
| 6,231,798 B1 | * 5/2001 | Matsumoto et al. | ........ 264/255 |

FOREIGN PATENT DOCUMENTS

| | | |
|---|---|---|
| DE | 44 23 652 A1 | 1/1996 |
| DE | 196 11 880 A1 | 10/1997 |
| EP | 0 597 219 A1 | 5/1994 |
| EP | 0 658 410 A2 | 6/1995 |
| JP | 01 262110 A | 1/1990 |
| JP | 03 247423 A | 1/1992 |
| JP | 08 174582 A | 11/1996 |

\* cited by examiner

*Primary Examiner*—Jill L. Heitbrink
(74) *Attorney, Agent, or Firm*—Henry M. Feiereisen

(57) ABSTRACT

In a method of producing injection-molded parts, an injection mold has two mold halves and a melt feeding device for application of melt across the mold surface of a mold half, when the injection mold is open. The melt is pressed into all areas of the mold cavity, when closing the mold halves. In order to simplify the arrangement of the hot runners in the mold half, when different injection-molded parts are produced, it is proposed to apply the melt onto the mold surface by a hot runner plate which is positioned above the mold surface, whereby the hot runner plate has several melt nozzles in the form of needle seal nozzles which are operated and controlled depending on the profile required for the respective mold half.

16 Claims, 2 Drawing Sheets

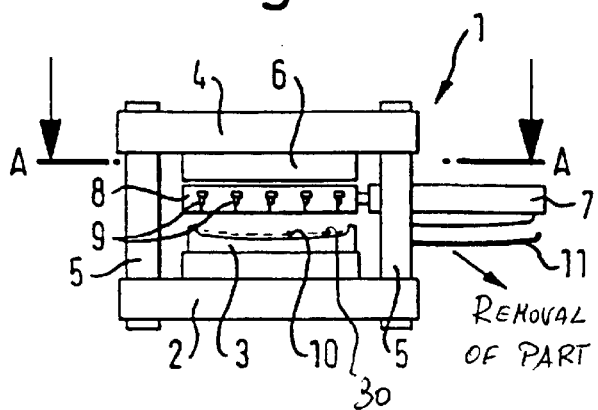
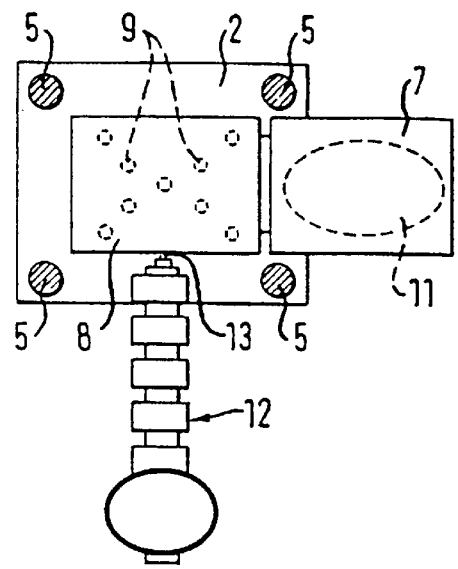
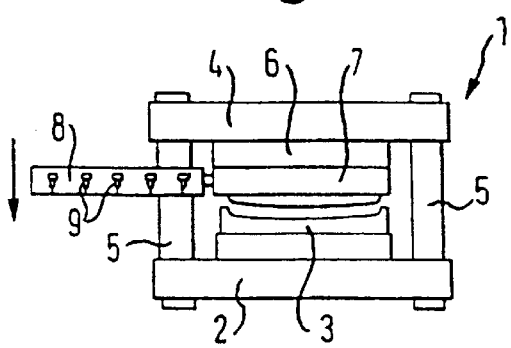
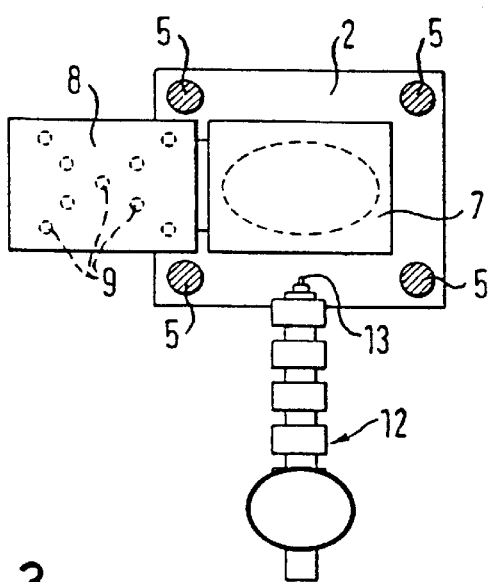
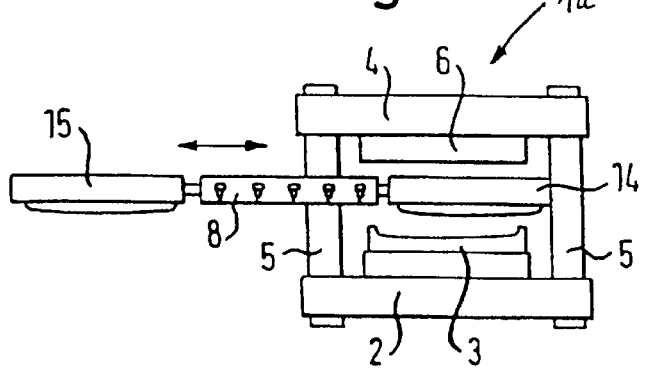

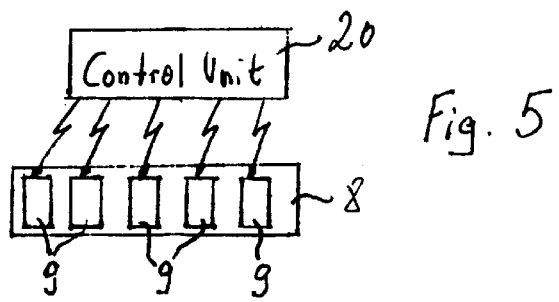
Fig. 5
Fig. 4a
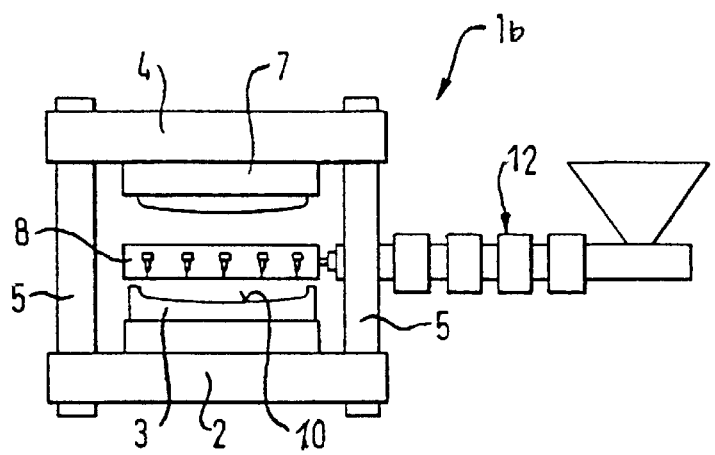
Fig. 4b
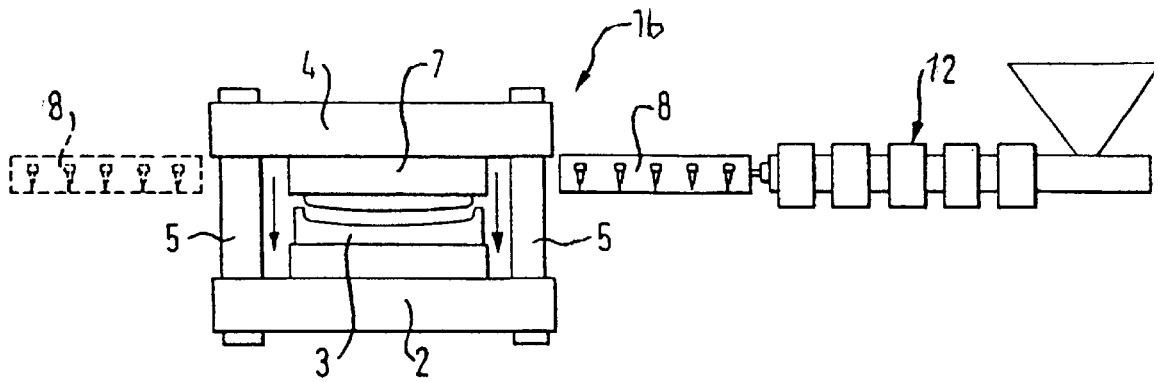

METHOD OF AND APPARATUS FOR PRODUCING INJECTION-MOLDED PARTS

CROSS-REFERENCES TO RELATED APPLICATIONS

This application is a continuation of prior filed copending PCT International application no. PCT/EP99/08912, filed Nov. 20, 1999.

This application claims the priority of German Patent Application Serial No. 198 53 582.1, filed Nov. 20, 1998, the subject matter of which is incorporated herein by reference.

BACKGROUND OF THE INVENTION

The present invention relates, in general, to a method and apparatus for producing injection-molded parts.

European Patent Specification EP 0 658 410 A2 describes a process in which melt is applied onto the mold surface via a hot runner system integrated in a mold half. The other mold half is disposed hereby at a distance to the first mold half and moved toward the first mold half to the closing position, when melt has been substantially applied onto the mold surface of the first mold half. The melt is spread into all regions of the mold cavity by way of a compression process. This manufacturing process, called swell flow process, is suitable in particular for precise production of large-area injection-molded parts; it has, however, the drawback that at those areas where the melt from the hot runner system reaches the mold surface of the one mold half images of melt exit openings are created in the form of so-called gate marks during the subsequent compression process. These gate marks are unacceptable, especially when optic articles, such as e.g. plastic panes for motor vehicles, are involved.

It is also known, e.g. from the EP 0 597 219, to distribute melt also via the slot die of a nozzle head guided across the mold surface of a mold half. In this process, the lamination is, however, relatively time-consuming and requires a complicated guide system for the nozzle head, for example a robot.

It would therefore be desirable and advantageous to provide an improved method and apparatus, obviating prior art shortcomings.

SUMMARY OF THE INVENTION

According to one aspect of the present invention, in a method of producing injection-molded parts in an injection molding machine with an injection mold having two mold halves, melt is applied onto a mold surface of one of the mold halves by a melt feeding device, when the injection mold is open, and the melt is subsequently pressed into all areas of a mold cavity by closing the mold halves, wherein the melt is applied onto the mold surface by a hot runner plate positioned above the mold surface of the one mold half, with the hot runner plate having a plurality of melt feeding nozzles in the form of individually controllable needle seal nozzles.

According to one aspect of the present invention, an apparatus for producing injection-molded parts, includes an injection mold having two mold halves, and a melt feeding device for supply of melt across a mold surface of one of the mold halves, wherein the melt feeding device includes a hot runner plate having a plurality of melt feeding nozzles, wherein the melt feeding nozzles are configured as individually controllable needle seal nozzles.

A feature of the invention is the provision of a separate component, the hot runner plate, to assume the function of the hot runner system, integrated heretofore in a mold half, for spreading the melt substantially evenly onto the mold surface in accordance with the swell flow process via one or more exit ports. The hot runner plate is moved into the open mold only for laminating melt onto the mold surface of a preferably horizontal mold half. Prior to the subsequent compression process, the hot runner plate is moved out. By subdividing this operation, melt can be applied across the mold surface of the mold half free from gate marks.

The functional split has also the advantage that each functional part, that is the mold, on the one hand, and the hot runner plate, on the other hand, can be kept at a temperature optimal for meeting its function.

The hot runner plate may be equipped in any suitable manner with the required needle seal nozzles. Advantageously, a universal hot runner plate can hereby be used which is equipped with needle seal nozzles for applying melt onto the mold surfaces of different mold halves, whereby only the operating profile for the needle seal nozzles needs to be modified. The use of several different molds and a universally useable hot runner plate is thus cost saving.

According to another feature of the present invention, the hot runner plate may be coupled to the other mold half. By way of a shuttle operation, application of melt upon the mold surface of the one mold half by means of the hot runner plate can hereby take place at a same time the finished injection-molded part is removed, outside the closing zone of the mold halves, from the other mold half which is coupled with the hot runner plate. Subsequently, parts to be encapsulated by injection, such as e.g. a frame part of a vehicle pane, can be placed into the moving mold half.

According to another feature of the present invention, the hot runner plate may be coupled with two moving mold halves. In each working phase, i.e. during application of melt onto the stationary or fixed mold half as well as during closing of two mold halves, one mold half is hereby always positioned outside the closing area of the injection molding machine and is freely accessible for handling devices of most different type. There is, for example, the option to withdraw finished injection-molded parts, to place parts to be encapsulated by injection (e.g. frame of a vehicle pane), or to introduce a web material. Basically, this offers also the option to produce with the first moving mold half and the stationary melt-laden mold half a first flat injection-molded part, whereby subsequently melt is again applied from the hot runner plate and then compressed with the second moving mold half. In order to identify only one of the many variations, the second moving mold part and the second melt layer can be pressed jointly with most different insert materials, such as frames, handles, hinges or the like.

BRIEF DESCRIPTION OF THE DRAWING

Other features and advantages of the present invention will be more readily apparent upon reading the following description of a preferred exemplified embodiment of the invention with reference to the accompanying drawing, in which:

FIG. 1a is a side view of one embodiment of a vertical injection molding machine with moved-in hot runner plate and moved-out mold half;

FIG. 1b is a plan view of the injection molding machine, taken along the line A—A in FIG. 1a;

FIG. 2a is a side view of the injection molding machine with moved-out hot runner plate and moved-in mold half;

FIG. 2b is a plan view of the injection molding machine of FIG. 2a;

FIG. 3 is a side view of another embodiment of an injection molding machine with two moving mold halves fixedly coupled with a hot runner plate;

FIG. 4a is a side view of yet another embodiment of a vertical injection molding machine with a plastifying unit moving back and forth together with the hot runner plate;

FIG. 4b is a side view of the injection molding machine of FIG. 4a with moved-out hot runner plate and partially lowered further mold half; and FIG. 5 is a block diagram showing the interrelationship between a control unit and the needle seal nozzles of the hot runner plate.

DETAILED DESCRIPTION OF PREFERRED EMBODIMENTS

Throughout all the Figures, same or corresponding elements are generally indicated by same reference numerals.

Turning now to the drawing, and in particular to FIG. 1a, there is shown a side view of one embodiment of a vertical injection molding machine, generally designated by reference numeral 1 and configured as a two-platen injection molding machine including a fixed mold mounting plate 2, which supports a fixed mold half 3, and a moving mold mounting plate 4, which is connected to the fixed mold mounting plate 2 via tie and guide rods 5. The moving mold mounting plate 4 carries a retainer plate 6 for support of a moving mold half 7, which is securely fixed with a hot runner plate 8 forming part of a melt feeding device. The hot runner plate 8 includes a number of needle seal nozzles 9 and is positioned above the mold surface 10 of the fixed mold half 3. The moving mold half 7 is disposed outside the closing zone of the injection molding machine 1 in a position in which a finished injection-molded part 11 can be removed. Coupled to the hot runner plate 8 is a plastifying unit 12, which is shown in FIG. 1b only, and includes an injection nozzle 13 for supply of melt, when the hot runner plate 8 is in the position shown in FIGS. 1a and 1b.

The needle seal nozzles 9 of the hot runner plate 8 can be operated individually by a suitable control unit 20 to best suit the melt supply to the situation at hand, i.e., the needle seal nozzles 9 can be selectively switched between open and closed positions and/or the duration of the opening position of the needle seal nozzles 9 can be controlled to apply controlled doses of melt, as indicated by the block diagram of FIG. 5. In this way, the same hot runner plate 8 may be used for differently configured injection molds, whereby it is only necessary to modify the switching profile for the needle seal nozzles 9 to implement the desired dosage and flat distribution of the melt across the mold surface 10. Optionally, a layer of web material 30 may be deposited upon the mold surface 10 of the mold half 3 before application of melt, as indicated by broken line in FIG. 1a by way of example only.

FIGS. 2a and 2b show the injection molding machine 1 in a position in which the hot runner plate 8 is moved sideways out of the closing zone while the conjointly moving mold half 7 is securely anchored on the retainer plate 6 of the moving mold mounting plate 4 and the plastifying unit 12 is retracted.

At operation of the injection molding machine 1, the functional unit of hot runner plate 8 and moving mold half 7 shuttles back and forth so that the hot runner plate 8 and the moving mold half 7 swap their position with respect to the fixed mold half 3. In one working phase, the hot runner plate 8 is moved into the position above the fixed mold half 3 and fluidly connected to the plastifying unit 12 for supply of melt which is applied through the nozzles 9 flatly across the mold surface 10 of the fixed mold half 3. Subsequently, in the other working phase, the hot runner plate 8 is moved sideways (FIG. 2a) so that the conjointly moving mold half 7 is shuttled into the position above the fixed mold half 3. The mold half 7 is then moved toward the fixed mold half 3, thereby compressing the melt in all areas of the mold cavity enclosed by the mold halves 3, 7.

The flat application of melt across the mold surface 10 is realized by the plurality of the needle seal nozzles 9 which can be linked in sequence by way of a cascade control so as to effect a continuous layer of melt, without entrapment of visually disturbing bubbles or joint lines.

Turning now to FIG. 3, there is shown a side view of another embodiment of an injection molding machine, generally designated by reference numeral 1a. Parts corresponding with those in the injection molding machine 1 are denoted by identical reference numerals and not explained again. In this embodiment, the hot runner plate 8 is connected with two moving mold halves 14, 15 placed on opposite sides of the hot-runner plate 8, so that the injection molding machine 1a can be operated in three working phases with respect to the fixed mold half 3. In one working phase, the hot runner plate 8 is moved into a position above the mold half 3 for application of melt across the mold surface 10. In another working phase, the hot runner plate 8 is moved sideways to the left out of the closing zone while the mold half 14 is moved into a position above the stationary mold half 3, as shown in FIG. 3, for compressing the melt. Mold half 15 is also outside the closing zone. After conclusion of the molding step, the hot runner plate 8 is moved back into the position above the mold half 3 for supply of melt, while the mold half 14 is moved out for removal of the finished molded part (not shown here). Subsequently, in a third working phase, the hot runner plate 8 is moved sideways to the right so that the mold half 15 is now positioned above the mold half 3 for compressing the melt in conjunction with the mold half 3. Then the cycle repeats again.

FIG. 4a shows another embodiment of an injection molding machine, generally designated by reference numeral 1b and also configured in the form a two-platen injection molding machine. Parts corresponding with those in the injection molding machine 1, 1a are denoted by identical reference numerals and not explained again. In this embodiment, the moving mold half 27 is mounted directly to moving mold mounting plate 4, and the hot runner plate 8 is securely fixed to the plastifying unit 12. In the position, shown in FIG. 4a, the hot runner plate 8 has moved into the space between the open mold halves 3 and 7 for supply of melt flatly across the mold surface 10 of the fixed mold half 3. In the illustration of FIG. 4b, the hot runner plate 8 is disposed outside the closing area of the injection molding machine 1b and the moving mold half 7 is on its way to the closing position upon the fixed mold half 3, as indicated by the arrows.

As indicated by broken line, the hot runner plate 8 may also move independently of the plastifying unit 12 in cycles into the space between the open mold halves 3, 7 and coupled there with the plastifying unit 32. After applying melt across the mold surface 10 of the fixed mold half 3, the hot runner plate 8 may move in opposite direction out of the closing area toward the plastifying unit 12.

While the invention has been illustrated and described as embodied in a method of producing injection-molded parts in an injection molding machine, it is not intended to be limited to the details shown since various modifications and structural changes may be made without departing in any way from the spirit of the present invention.

What is claimed as new and desired to be protected by Letters Patent is set forth in the appended claims:

What is claimed is:

1. A method of producing injection-molded parts in an injection molding machine with an injection mold having two mold halves, with melt being applied onto a mold surface of one of the mold halves by a melt feeding device positioned above the mold surface, when the injection mold is open, and with the melt subsequently pressed into all areas of a mold cavity by closing the mold halves after removal of the melt feeding device, wherein the melt is applied onto the mold surface by a single hot runner plate positioned to cover the entire mold surface of the one mold half, wherein the hot runner plate has a plurality of melt feeding nozzles, wherein the melt feeding nozzles are configured as individually controllable needle seal nozzles.

2. The method of claim 1, and further comprising depositing a layer of web material upon the mold surface of the one mold half before application of melt.

3. A method of producing injection-molded parts, comprising the steps of:

moving a single hot runner plate to an operative position in which an entire mold surface of a first mold half of an injection mold is covered;

applying melt across the mold surface of the first mold half via a plurality of individually controlled nozzles of the hot runner plate;

removing the hot runner plate from the operative position while moving a second mold half into the operative position above the first mold half; and moving the mold halves together to thereby compress the melt between the mold halves.

4. The method of claim 3, wherein the applying step includes discharging a controlled dose of melt to suit a configuration of the mold surface of the first mold half.

5. The method of claim 3, wherein the applying step includes activation of some of the nozzles and deactivation of the remaining nozzles to suit a configuration of the mold surface of the first mold half.

6. Apparatus for producing injection-molded parts, comprising:

an injection mold having two mold halves; and a melt feeding device for supply of melt across a mold surface of one of the mold halves, wherein the melt feeding device includes a single hot runner plate movable into an operative position above the one mold half and configured to fully cover the mold surface of the one mold half, wherein the hot runner plate has a plurality of melt feeding nozzles which are configured as individually controllable needle seal nozzles.

7. The apparatus of claim 6, and further comprising a control unit for selectively operating the nozzles to suit melt application to a configuration of the mold surface of the one mold half.

8. The apparatus of claim 7, wherein the control unit is configured to control at least one of activation and deactivation of the nozzles, and duration of opening phase of activated nozzles.

9. The apparatus of claim 6, wherein the needle seal nozzles are activated by means of a cascade control.

10. The apparatus of claim 6, and further comprising a plastifying unit having a nozzle in fluid communication with hot runner plate, when the hot runner plate is positioned above the mold surface of the one mold half.

11. The apparatus of claim 10, wherein the hot runner plate is securely connected to the plastifying unit and travels back and forth conjointly with the plastifying unit.

12. The apparatus of claim 10, wherein the hot runner plate is securely connected to the other one of the mold halves to form a functional unit such that the hot runner plate and the other mold half swap their position above the one mold half.

13. The apparatus of claim 10, wherein the one mold half is fixed and the other mold half is movable, and further comprising a second movable mold half, wherein the hot runner plate is securely connected to both movable mold half halves to form a functional unit therewith such that the hot runner plate and both movable mold halves swap their position above the fixed mold half.

14. The apparatus of claim 6, and further comprising removal means interacting with the other mold half when the hot runner plate is positioned above the mold surface of the one mold half, for withdrawing finished injection-molded parts.

15. The apparatus of claim 6, and further comprising means for depositing insert material upon the mold surface of the other mold half, when the hot runner plate is positioned above the mold surface of the one mold half.

16. The apparatus of claim 6, wherein the injection mold includes a vertically movable closing system, and wherein the mold halves define a horizontal mold partition plane.

* * * * *